US008780135B2

(12) United States Patent
Paris (10) Patent No.: US 8,780,135 B2
(45) Date of Patent: Jul. 15, 2014

(54) SYSTEM AND METHOD FOR REDUCING THE APPEARANCE OF RESIDUALS IN GRADIENT-BASED IMAGE COMPOSITING

(75) Inventor: Sylvain Paris, Boston, MA (US)

(73) Assignee: Adobe Systems Incorporated, San Jose, CA (US)

(*) Notice: Subject to any disclaimer, the term of this patent is extended or adjusted under 35 U.S.C. 154(b) by 1176 days.

(21) Appl. No.: 12/393,881

(22) Filed: Feb. 26, 2009

(65) Prior Publication Data

US 2013/0127903 A1    May 23, 2013

(51) Int. Cl.
*G06T 11/60*     (2006.01)
(52) U.S. Cl.
USPC .............................................. 345/634
(58) Field of Classification Search
CPC ............. G06T 11/60; G06T 2207/20212; G06T 2207/20221
USPC ........................................ 345/634
See application file for complete search history.

(56) References Cited

U.S. PATENT DOCUMENTS

2007/0013813 A1*   1/2007   Sun et al. ................. 348/587

FOREIGN PATENT DOCUMENTS

EP             1748389 A1 *   1/2007
WO    WO-2007/016301 A2 *   2/2007

OTHER PUBLICATIONS

Jian Sun, Jiaya Jia, Chi-Keung Tang, and Heung-Yeung Shum, Poisson Matting, Aug. 2004, ACM Transactions on Graphics (TOG)—Proceedings of ACM SIGGRAPH 2004, vol. 23, Issue 3, pp. 315-321.*
P. Perez, et al., "Poisson Image Editing," ACM Transactions on Graphics, vol. 22, No. 3, Jul. 2003, proceedings of the ACM SIGGRAPH conference.
A. Agarwala, et al, "Interactive digital photomontage," ACM Transactions on Graphics, vol. 23, No. 3, pp. 294-302, Jul. 2004, proceedings of the ACM SIGGRAPH conference.
T. Georgiev, "Covariant derivatives and vision," in Proceedings of the European Conference on Computer Vision, 2006.
J. Jia, et al, "Drag-and-drop pasting," ACM Transactions on Graphics, vol. 25, No. 3, Jul. 2006, proceedings of the ACM SIGGRAPH conference.
A. Levin, et al, "Seamless image stitching in the gradient domain," in Proceedings of the European Conference on Computer Vision, 2006.
A. Agarwala, "Efficient gradient-domain compositing using quadtrees," ACM Transactions on Graphics, vol. 26, No. 3, 2007, proceedings of the ACM SIGGRAPH conference.
A. Agarwala, "What is the range of surface reconstructions from a gradient filed?," in Proceedings of the European Conference on Computer Vision, 2006.

(Continued)

*Primary Examiner* — Jeffery A Brier
(74) *Attorney, Agent, or Firm* — Wolfe-SBMC (57) ABSTRACT

A system and method are proposed for performing gradient-based compositing in a manner that reduces the appearance of residual errors as compared to traditional techniques. In embodiments, a target gradient field may be determined for a composite image and a solution composite image may be sought which minimizes a weighted aggregate error between the gradient field of the composite image and the target gradient field. The weighted aggregate error may be calculated such that a greater weight is placed on residuals occurring in smooth regions than on those occurring in textured regions, since residuals in textured regions may be less noticeable. In some embodiments, a weighted aggregate error may be defined as a weighted least-squares sum and/or minimized by solving a weighted Poisson equation. The computational cost of solving the weighted Poisson equation may be mitigated by ensuring that the equation is linear.

24 Claims, 5 Drawing Sheets

(56) References Cited

OTHER PUBLICATIONS

M. Harker, et al., "Least squares surface reconstruction from measured gradient fields," in Proceedings of the Computer Vision and Pattern Recognition Conference, IEEE, 2008.

J-F. Lalonde, et al, "Photo clip art," ACM Transactions on Graphics, vol. 26, No. 3, Jul. 2007, proceedings of the ACM SIGGRAPH conference.

G. Drettakis, et al, "An interactive perceptual rendering pipeline using contrast and spatial masking," Rendering Techniques, 2007.

G. Ramanarayanan, et al, "Visual Equivalence: Towards a new standard for image fidelity," ACM Transactions on Graphics, vol. 26, No. 3, 2007, proceedings of the ACM SIGGRAPH conference.

P. Vangorp, et al., "The influence of shape on the perception of material reflectance," ACM Transactions on Graphics, vol. 26, No. 3, 2007, proceedings of the ACM SIGGRAPH conference.

G. Ramanarayanan, et al, "Perception of complex aggregates," ACM Transactions on Graphics, vol. 27, No. 3, 2008, proceedings of the ACM SIGGRAPH conference.

S. Daly, Digital images and human vision, MIT Press, 1993, c. "The visible differences predictor: an algorithm for the assessment of image fidelity".

T.O. Aydin, et al., Dynamic range independent image quality assessment, ACM Transactions on Graphics, vol. 27, No. 3, 2008, proceedings of the ACM SIGGRAPH conference.

Z. Farbman, et al., "Edge-preserving decompositions for multi-scale tone and detail manipulation," ACM Transactions on Graphics, vol. 27, No. 3, 2008, proceedings of the ACM SIGGRAPH conference.

P. Perona, et al., "Scale-space and edge detection using anisotrpic diffusion," IEEE Transactions Pattern Analysis Machine Intelligence, vol. 12, No. 7, pp. 629-639, Jul. 1990.

* cited by examiner

*FIG. 4A* — Transition Effects 400, Foreground Image 410, Background Image 420

*FIG. 4B* — Residual 430

*FIG. 4C* — Residual 440

FIG. 5

SYSTEM AND METHOD FOR REDUCING
THE APPEARANCE OF RESIDUALS IN
GRADIENT-BASED IMAGE COMPOSITING

BACKGROUND

1. Field of the Invention

This invention relates generally to image processing and, more specifically, to a system and method for reducing the appearance of errors in gradient-based image compositing.

2. Description of the Related Art

In photo editing, the need often arises for stitching together two or more images into a single composite image. For example, two offset images of the same scene may be stitched together to produce a single composite panoramic image of the scene. Alternatively, images of two different scenes may be combined to generate a composite scene. For example, a user may overlay an image of a tree onto an image of a field, in order to produce a scene of a tree growing in a field.

However, straightforward approaches to image stitching may cause harsh and noticeable transition effects at the boundaries (i.e., seams) between the combined images. Gradient compositing is a popular technique for stitching images together, either for local edits or panorama stitching, wherein the appearance of transition effects is mitigated. In such methods, two or more images are first delineated and a target image gradient field and boundary conditions are calculated from the images. A gradient field may comprise a series of vectors, each corresponding to a region of an image (e.g., a pixel coordinate) and having a direction and amplitude indicating the direction and amplitude of color intensity changes in the image at the corresponding region. The direction/amplitude of each vector may be a function of the color/intensity of numerous other pixels in the input images. Various methods are currently used to calculate the target gradient field of a composite image. For example, the target gradient field may be determined using the gradient fields of the input images.

Once a target gradient field v is calculated, a solution composite image I is determined such that the gradient field of I differs least from v. In some methods, the closeness of a proposed image solution I may be quantified by a least-squares measurement. In some techniques, determining an appropriate I involves setting up and solving a Poisson equation with the appropriate parameters.

However, a shortcoming of traditional gradient compositing is that it is sometimes impossible to determine a solution composite image whose gradient field matches the target gradient field exactly. Such inexact solution images may contain undesirable error artifacts, known as residuals.

SUMMARY

A system and method are proposed for performing gradient-based compositing in a manner that may reduce the appearance of residual errors as compared to traditional techniques. According to various embodiments, traditional gradient-based compositing techniques may be augmented so that solution composite images wherein residuals occupy textured regions may be preferred over those wherein residuals occupy smooth regions. Residual errors that occur on textured regions may be less noticeable than those that occur on smooth regions.

In various embodiments, a target gradient field may be determined for a composite image and a solution composite image may be sought which minimizes a weighted aggregate error between the gradient field of the composite image and the target gradient field. In embodiments, the weighted aggregate error may be calculated such that a greater weight is placed on residuals occurring in smooth regions than on those occurring in textured regions. In some embodiments, a weighted aggregate error may be defined as a weighted least-squares sum and/or minimized by solving a weighted Poisson equation. In some embodiments, the computational cost of solving the weighted Poisson equation may be mitigated by ensuring that it is linear rather than of a higher order. In such embodiments, various linear equation solving techniques may be employed for determining a solution to the weighted Poisson equation.

In some embodiments, a scalar map may be determined, wherein the map correlates a scalar value with each region (e.g., pixel coordinate) of a composite image. In embodiments, the weighted aggregate error of a proposed composite image solution may depend on the error of each region (i.e., the disparity between the gradient field of the composite image and the target gradient field at the region), scaled by the corresponding value defined by the scalar map for that region. In embodiments, the scalar map may correlate relatively higher scalar values with smooth regions than with textured regions, thereby causing relatively larger errors to result from images with residuals in smooth regions.

In some embodiments, the computational cost of solving a weighted Poisson equation may be mitigated by ensuring that it is linear. In some embodiments, this may be done by ensuring that the scalar map is not dependent on the composite image or on the gradient field of the composite image. In some embodiments, a scalar map may be dependent on the target gradient field. In such embodiments, the scalar map may be determined by calculating the convolution of amplitudes of the target gradient field with a Gaussian kernel.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Gradient compositing is a popular technique for stitching two or more digital images together, for example, for local edits or panorama stitching. The approach normally involves generating a target gradient field v from the two or more images and then attempting to find a composite image solution whose gradient field is closest to the target gradient field. The gradient field of a proposed image solution I may be denoted herein as $\nabla I$ and may track the direction and amplitude of light and/or color intensity changes at various points of I.

A major shortcoming of gradient-based image compositing is that the combined gradient field v may be non-integrable, that is, there may not exist a solution image I whose gradient field ($\nabla I$) matches the target field v exactly. Using traditional techniques, when the generated target field is non-integrable, the resulting image I may contain color leaks and/or halos, an outcome typical of gradient-based image compositing techniques. Such effects may be referred to herein as residuals or artifacts.

In various embodiments, gradient-based image compositing techniques may be augmented in order to mitigate the undesirable visual effects of residuals on the quality of the final image solution. In some embodiments, this mitigation may be achieved by introducing a preference for composite image solutions wherein residuals appear in textured regions of the final composite image rather than in smooth regions of such images. That is, with all else being equal, a solution image with a given residual in a textured region may be preferred over the same solution image wherein the given residual appears in a smooth region rather than in the textured region. As used herein, a textured region may refer to a region of an image with high color variability (e.g., color and/or light intensity) among the pixels comprising that region. A smooth region may refer to a region of an image with low pixel variability.

Figure 1A:
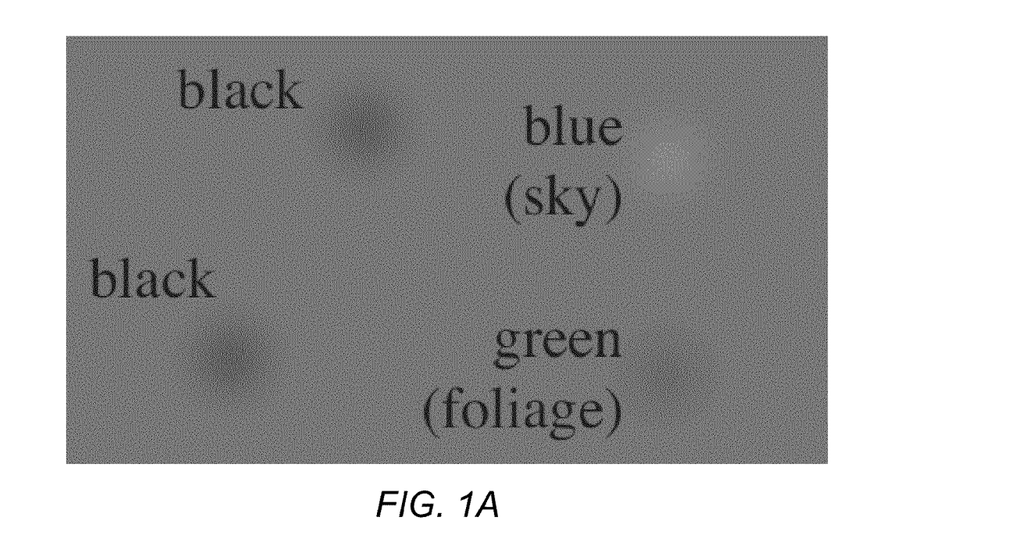
FIG. 1A illustrates that residuals on a smooth background are noticeable.
Figure 1B:
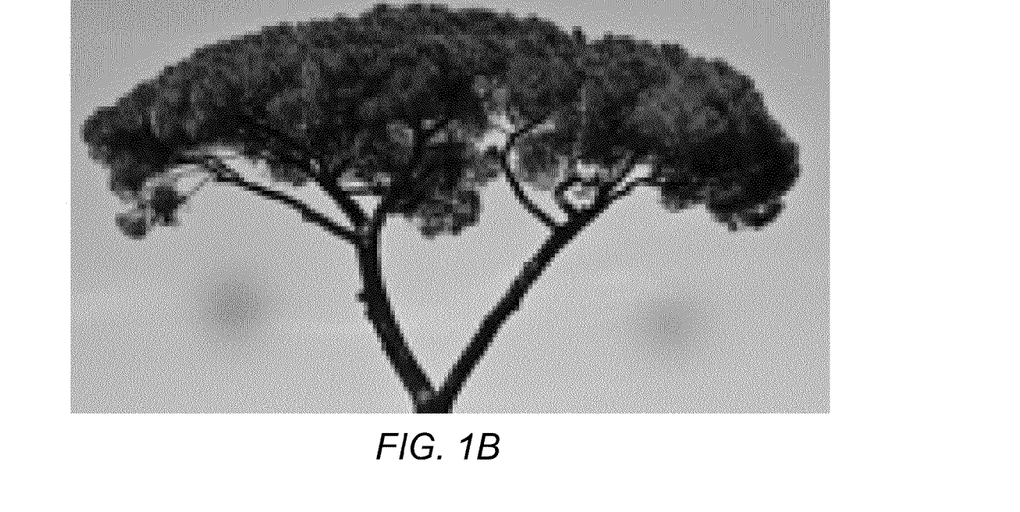
FIG. 1B illustrates that residuals on a textured background are less noticeable than residuals on a smooth background.

Residuals that appear in textured regions may be less readily perceptible by the human eye than residuals that appear in smooth regions of an image. For example, FIG. 1A illustrates four spots of different colors overlayed on a smooth gray background while FIG. 1B illustrates the same four spots overlayed on a photograph that is composed of both smooth and textured regions. While the four spots are clearly visible on the smooth gray background of FIG. 1A, only the lower two spots are readily noticeable in FIG. 1B. The noticeable spots in FIG. 1B appear on the smooth sky portion of the photograph. Contrastingly, the less noticeable upper two spots appear on the highly textured region of tree foliage. Thus, residuals may be less visible when they appear in textured regions.

In various embodiments, two or more images may be stitched together using a gradient-based image compositing technique in a manner that mitigates the perceptibility of residuals in the final composite image by imposing a preference for solutions that place residuals in textured regions of the final image rather than in smooth, non-textured regions of the final image.

Figure 2:
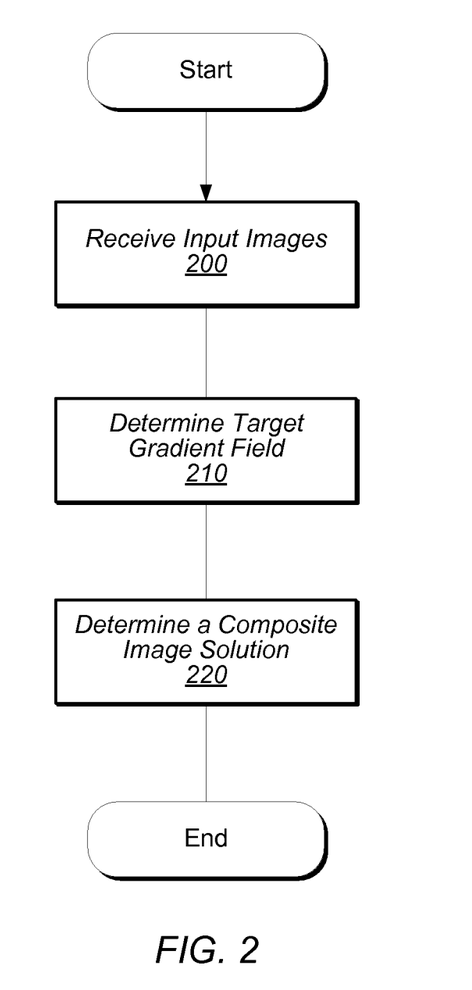
FIG. 2 is a flowchart illustrating a method for gradient compositing, according to some embodiments.

FIG. 2 is a high-level flowchart illustrating a method for gradient-based digital image compositing, according to one embodiment. The method may be performed in part by a computer system as described below. The illustrated method begins by receiving two input images, as in 200. An image may comprise of a number of pixels, each corresponding to a unique spatial coordinate of the image and having one or more display attributes, such as color and/or intensity. For example, in some embodiments, each pixel may be associated with a red level, green level, and blue level.

In various embodiments, the digital images may be received with instructions regarding how they are to be combined. For example, in one instance, the images may be combined at the edges to form a panoramic image. In another instance, one image may be overlayed onto another, larger image in order to create a composite scene. In various embodiments, more than two images may be received in 200. However, for clarity of explication, many of the embodiments described herein are explained in terms of combining only two images, though this is not intended to be limiting.

In some embodiments, a target gradient field (v) may be determined, as in 210, using the digital images received in 200. A gradient field may correlate one or more vectors (i.e., gradients) with each discrete area of an image. For example, in some embodiments, a vector may be correlated with each pixel coordinate of an image. In other embodiments, one or more vectors may correspond to a region of an image, which may comprise multiple pixel coordinates.

In some embodiments, each vector may comprise a direction and amplitude representing the direction and amplitude of greatest change in one or more image characteristics, at a corresponding region or pixel coordinate in the image. For example, a vector may identify the direction and amplitude of greatest change in color intensity from a given pixel coordinate in the image. In some embodiments, a vector may have multiple dimensions. For instance, a vector may comprise three tuples, each corresponding to the amplitude and direction of greatest change in a particular color value (e.g., red, green, blue) from a given point. In general, a vector in a gradient field may be used to indicate a direction and amplitude of change in any number of image characteristics from a given point in the image. In some embodiments, gradient vectors may be calculated using the display characteristics of any number of pixels in an image. For example, a gradient vector for a given pixel coordinate may be calculated based on the display characteristics of the pixels immediately surrounding the given pixel coordinate. In other embodiments, a larger pixel "neighborhood" may be defined and used. In other embodiments, the display characteristics of every pixel in an image may be considered when calculating a gradient vector for a given pixel coordinate.

In various embodiments, determining a target gradient field may include determining a gradient field for each of the input images (e.g., those from 200). For example, in 200, background image $I_B$ and foreground image $I_F$ may be received along with instructions regarding how they are to be combined (e.g., overlay $I_F$ onto $I_B$ at given pixel coordinates). In some embodiments, a gradient field for each input image may be generated according to various methods known in the art. Many such methods exist and any variation may be used in various embodiments. In some embodiments, rather than calculating the gradient fields, the gradient fields of one or both images may be received as input, for example in 200.

Once a gradient field has been determined for each input image, in embodiments, a target gradient field may be generated using the two input gradient fields and information regarding how the input images should be combined. For example, each pixel coordinate of the composite image that corresponds to a pixel P of $I_B$ may inherit its gradient vector from the gradient field of $I_B$ at the coordinate corresponding to P. Conversely, each pixel of the composite image that corresponds to a pixel of $I_F$ may inherit its gradient vector from the corresponding pixel coordinate of the vector field of $I_F$. In some embodiments, averaged vectors from both $I_B$ and $I_F$ may be used to represent pixels of the composite image that correspond to border regions (i.e., regions at the boundary between $I_B$ and $I_F$ in the composite image). In different embodiments, the size of border regions may differ. The number of vectors averaged to calculate an averaged vector and/or the choice of pixel coordinates to average, may also vary across embodiments. Here, the term "average" is used generally to imply a statistical combination of elements and not strictly an arithmetic mean. Other statistical combinations are possible, for example, a geometric mean, weighted arithmetic mean, median, mode, and/or other combination operations. Various other existing methods may be used for determining a target gradient field.

Once a target gradient field v has been determined, a composite image solution I may be determined, as in 220. In embodiments, a composite image solution I may be sought such that a gradient field of I (i.e., $\nabla I$) is as close as possible to the target gradient field v. As described earlier, cases may arise in which there does not exist an exact solution and therefore any solution I must introduce residual errors. As discussed earlier, in various embodiments, solutions with error in textured regions may be generally preferred over solutions with error in smooth regions.

Traditionally, the fitness of a composite image solution has been measured in terms of a least-squares distance between its gradient field and a target gradient field. For example, the fitness of a solution I with respect to a target v may be calculated as:

$$\operatorname{argmin}_I \|\nabla I - v\|^2 \qquad (1)$$

However, the shortcoming of this traditional approach is that residuals at all points are considered with equal weight. In some embodiments, the fitness of a composite image solution may be calculated as a weighted least-squares distance, for example by:

$$\operatorname{argmin}_I \int M \|\nabla I - v\|^2 \qquad (2)$$

where M may be a scalar map with high values corresponding to smooth regions with little texture (where errors may be more visible) and low values corresponding to regions with high texture (where errors may be less visible). The term scalar map may be used herein in the standard mathematical sense. In some embodiments, a scalar map M may define a scaling value for each pixel coordinate of the composite image.

By imposing the scaling described above, errors in smooth regions may be more detrimental to the fitness of a solution than errors in textured regions. Therefore, the introduction of the scalar map M may cause solution images with errors in textured regions to be judged more fit than those with the errors in smooth regions.

In various embodiments, a solution I that minimizes a weighted least-squares distance may be found using different techniques. For example, in methods known in the art, a solution to the traditional (unweighted) least-squares fitness function (1) may be found by solving the Poisson equation:

$$\Delta I - \operatorname{div}(v) = 0 \qquad (3)$$

where $\Delta$ is the Laplacian operator $\partial^2/\partial x^2 + \partial^2/\partial y^2$ and div is the divergence operator $\partial/\partial x + \partial/\partial y$. To solve this equation, boundary conditions may be necessary, which may depend on input images and placement. For instance, for cutting-and-pasting, the coordinates of the boundary pixels may provide these conditions.

In various embodiments, a solution to a weighted least-squares fitness function (e.g., (2)) may be found by solving a modified Poisson equation. In such embodiments, the Poisson equation of (3) may be augmented using the Euler-Lagrange formula and the scalar map M as follows:

$$\operatorname{div}(M(\nabla I - v)) = 0 \qquad (4)$$

The modified Poisson equation (4) may be solved using various existing techniques, such as those used to solve the traditional equation (3). For example, in some embodiments, one or more linear programming software packages may be used to determine a solution to equation (4). The modified Poisson equation may be referred to herein as a weighted Poisson equation.

Figure 3:
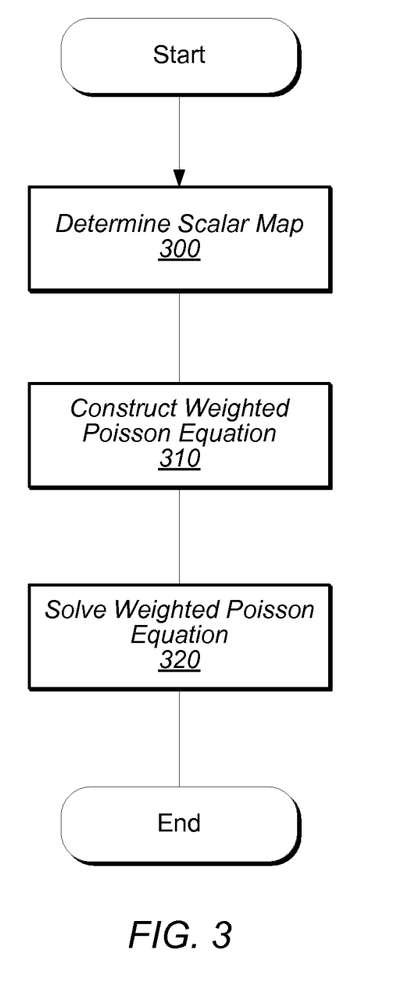
FIG. 3 is a flowchart illustrating a method for determining a composite image solution by solving a weighted Poisson equation, according to some embodiments.

FIG. 3 illustrates a high-level method for using a gradient-based technique in order to determine a composite image solution, according to various embodiments. The illustrated method may correspond to element 220 of FIG. 2. The illustrated method begins, at element 300, by determining a scalar map M, to be used, for example, in equation (4). In embodiments, the values that comprise M may be positive and have higher values where residuals would be most noticeable (e.g., smooth regions of I) and lower values where residuals would be least noticeable (e.g., textured regions of I).

In various embodiments, M may be a number between zero and 1 at all points. In such embodiments, the convergence properties of a modified Poisson equation, such as (4), may be similar to those of the traditional Poisson equation, such as (3).

In various embodiments, scalar map M may be constructed to mitigate the computational cost of finding a solution to the modified Poisson equation (e.g., (4)). For example, in some embodiments, M may not be a function of I or of ∇I. In such embodiments, finding a satisfactory composite image I may be less computationally expensive because a corresponding Poisson equation (e.g., (4)) may be linear; generally, linear equations can be solved with lower computational cost than can equations of higher orders. For example, in embodiments wherein M is not dependent on I or on ∇I, various commercially or freely available linear solvers may be used to determine a solution to the (linear) modified Poisson equation.

In some embodiments, a model based on image variations may be used to construct M. Recall that in some embodiments, highly textured areas may correspond to lower values in M, since residuals in textured regions may have less negative visual impact on the solution than residuals in smooth regions. In order to determine the level of texture in a given region of the solution composite image, the solution image itself may be used. However, this may result in a non-linear modified Poisson equation. In some embodiments, the target gradient field v may be used to estimate the relative texture of regions in the composite image solution. In such embodiments, M need not be based on I or on ∇I, which may allow a solution to be computed with relatively lower computational cost. Although v may describe the target image variations rather than the actual image variations, the vectors of v may provide a sufficiently good estimate of the resulting image's texture. For example, in one embodiment, M may be calculated as:

$$M = 1 - \min\left(1, \frac{\|v\|}{G_\partial \otimes \|v\|}\right) \quad (7)$$

where $G_\partial \otimes \|v\|$ is the convolution of the amplitudes of v with a Gaussian kernel. $G_\partial \otimes \|v\|$ may represent the average local variation of each vector. In various embodiments, the quantification of "local" may differ. That is, a different number of surrounding pixels (i.e., size of a pixel's neighborhood) may be considered in determining the extent to which the pixel is part of a textured or smooth region.

In some embodiments, a vector with amplitude sufficiently greater than the local average may be considered textured. For example, locations in which a vector's amplitude is greater than that of the surrounding neighborhood (i.e., $\|v\|/(G_\partial \otimes \|v\|) \geq 1$) may have variations above their local averages and may thus be suitable for containing integration residuals, according to some embodiments. As described earlier, such locations may be correlated with a higher value of M than are smoother locations. In some embodiments, such as those using equation (7), the value of M may be bounded between 0 and 1, as indicated by the in function of (7). Finally, the 1-operation ensures that M has low values in smooth regions and high values in textured regions while remaining between 0 and 1.

In some embodiments, the degree to which the placement of residuals depends on the texture of a region may be customizable. For example, equation (7) may be augmented with a global parameter p as follows:

$$M = 1 - p\min\left(1, \frac{\|v\|}{G_\partial \otimes \|v\|}\right) \quad (8)$$

In equation (8), the degree of control over the placement of residuals may be controlled. For example, if p=0, then M is always equal to 1 and the modified Poisson equation (4) is equal to the traditional Poisson equation (3). On the other extreme, if p=1, then equation (8) is equal to equation (7). In some embodiments, p may be set to a value strictly smaller than 1 in order to ensure that M is always greater than 0.

In some embodiments, equation (7) or (8) may be sensitive to noise in smooth regions, for example, because $G_\partial \otimes \|v\|$ may be small in such regions. In some embodiments, equation (7) or (8) may be modified in order to reduce sensitivity to noise in smooth regions. For example, equation (8) may be modified as follows:

$$M = 1 - p\min\left(1, \frac{\|v\|n(\|v\|)}{G_\partial \otimes \|v\|}\right) \quad (9)$$

Equation (9) introduces a function n that may adjust for noise when $G_\partial \otimes \|v\|$ is small. For example, n may be a function that is equal to 1 for all except small values. For small values, n may be equal to 0. Various criteria may be chosen to define what constitutes a "small" value.

Once a scalar map M has been determined, as described above, a modified Poisson equation, such as (4) may be constructed, as in 310. The equation may then be solved, as in 320, to determine a solution composite image I with a high fitness as measured by a weighted least-squares distance, such as equation (2). In embodiments wherein M is not based on I, a commercially or freely available linear solver may be used to solve the equation.

Figure 4A:
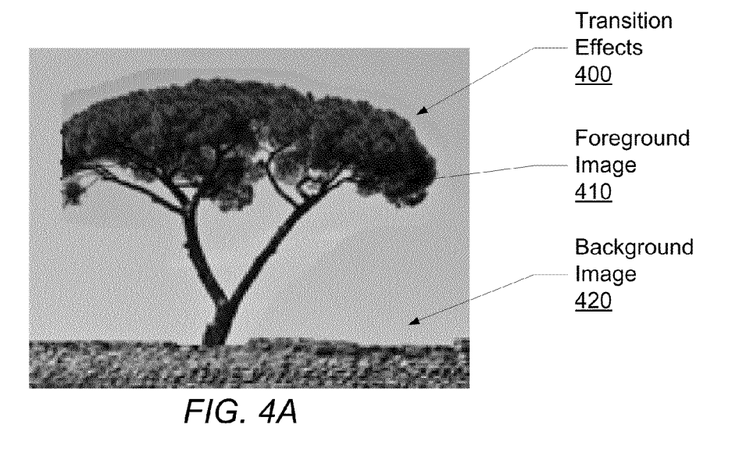
FIG. 4A illustrates the transition effects of naïve image compositing.
Figure 4B:
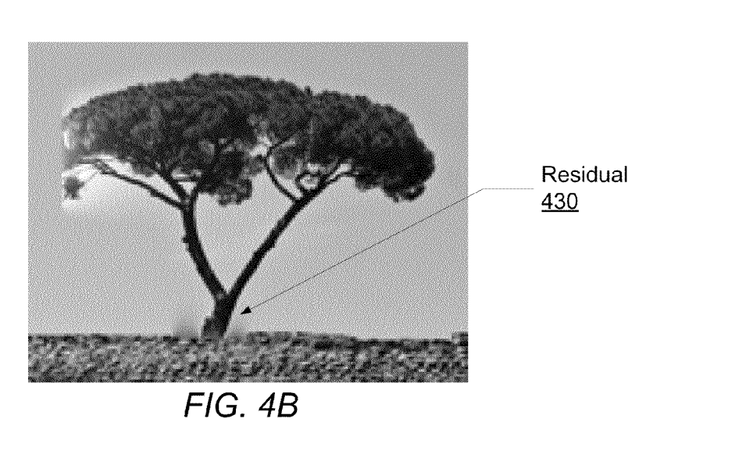
FIG. 4B illustrates the residuals left behind when traditional gradient compositing is applied.
Figure 4C:
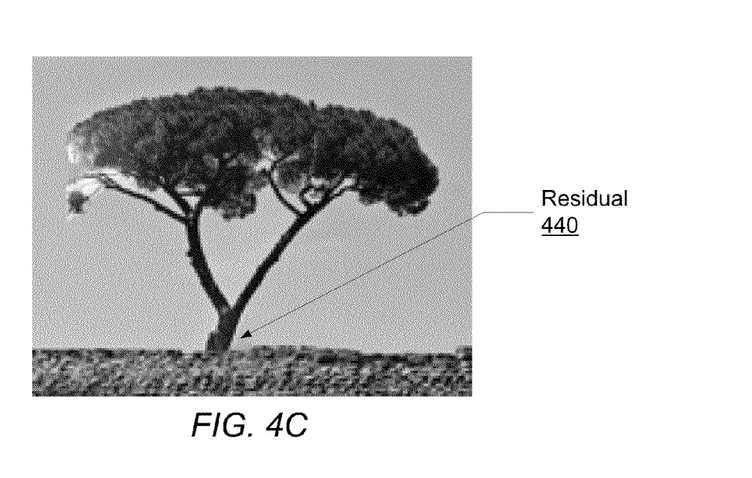
FIG. 4C illustrates the residuals left behind when weighted gradient compositing is applied as described herein, according to various embodiments.

FIGS. 4A-4C illustrate how various embodiments may improve the visual appearance of a composite image. FIG. 4A illustrates a composite image composed of foreground image 410 overlayed on a background image 420. Some artifacts of the pasting are still evident, as illustrated by transition effects 400. FIG. 4B illustrates the results of attempting to reduce the appearance of transition effects 400 by applying a traditional (un-weighted) Poisson-based composite imaging technique to the image in FIG. 4A. As illustrated in FIG. 4B, the un-weighted Poisson-based technique may cause the appearance of one or more residuals, such as residual 430. In various embodiments, a weighted Poisson-based technique may be used to find composite image solutions with residuals in textured regions rather than in smooth regions of the final image. FIG. 4C illustrates the results of applying such a technique, according to various embodiments described herein, to the image of FIG. 4A. The residuals of FIG. 4C, such as residual 440, are much less noticeable to the human eye than those of FIG. 4B, such residual 430.

Figure 5:
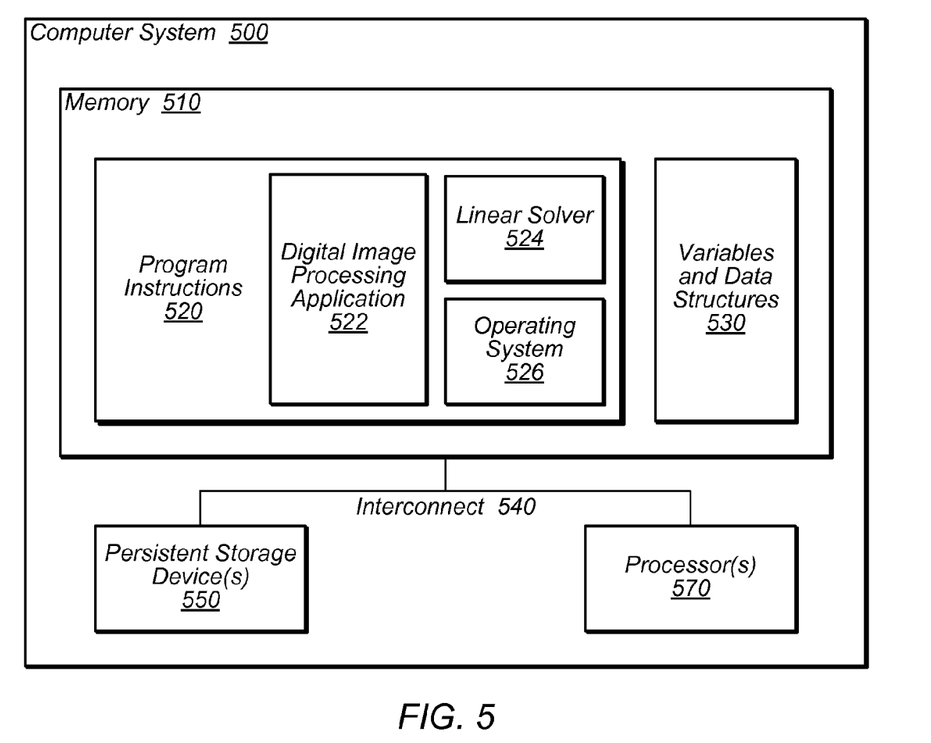
FIG. 5 is a block diagram of a computer system configured to implement gradient compositing, according to various embodiments.

FIG. 5 illustrates a computer system configured to implement image compositing, according to one embodiment, as described herein. The computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

A computer system 500 may include one or more processors 570, each of which may include multiple cores, any of which may be single or multi-threaded. The computer system 500 may also include one or more persistent storage devices 550 (e.g. optical storage, magnetic storage, hard drive, tape drive, solid state memory, etc) and one or more memories 510 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.)

The one or more processors 570, the storage device(s) 550, and the system memory 510 may be coupled to the system interconnect 540. One or more of the system memories 510 may contain program instructions 520. Program instructions 520 may include program instructions executable to implement one or more operating systems 526, digital image processing applications 522, and/or linear program solvers 524, as described herein. Program instructions 520 may be encoded in platform native binary, any interpreted language such as Java™ byte-code, or in any other language such as C/C++, Java™, etc or in any combination thereof.

In some embodiments, digital image processing application 522 may be an image editing application such as Adobe Photoshop™, Corel Paint Shop Pro™, or other applications. Digital image processing application 522 may be configured to accept one or more digital images and perform an image compositing operation, as described herein. For example, the image compositing operation may be a panorama stitching operation in which multiple images are stitched together to form a panoramic image, where a portion of one image is composited with a matching portion of another image. A healing brush tool is another example involving a compositing operation in which a portion of an image may be copied and composited with another portion of the same image. Digital image processing application 522 may construct a weighted Poisson equation and utilize linear solver 524 to determine a best fit composite image solution. Linear solver 524 may be implemented as a shared library and/or used by one or more digital image processing applications 522. In some embodiments, linear solver 524 may be part of digital image processing application 522. In other embodiments, linear solver 524 may be implemented as a stand-alone application. The digital image processing functionality described herein may be spread across additional software components defined by program instructions 520 but not pictured in FIG. 5.

The system memory 510 may further comprise variables and data structures 530. Variables and data structures 530 may be used to store data used combining two or more images into a composite image, as described above. For example, the foreground and background images may be kept in memory as variables and/or data structures 510. Images may also be kept in a file system on persistent storage device 550.

The techniques described herein may be used in photo editing, when the need arises for stitching together two or more images into a single composite image. For example, two offset images of the same scene may be stitched together, according to various embodiments described herein, to produce a single composite panoramic image of the scene, which exhibits less pronounced residual effects than do those produced using prior art techniques. In another use, images of two different scenes may be combined, according to various embodiments, to generate a composite scene with less noticeable residual artifacts. For example, a user may overlay an image of a tree onto an image of a field, in order to produce a scene of a tree growing in a field with less noticeable residual artifacts.

Although the embodiments above have been described in considerable detail, numerous variations and modifications will become apparent to those skilled in the art once the above disclosure is fully appreciated. For example, in embodiments where a larger computational budget is available, the Guassian convolution method of identifying textured regions may be replaced with a more sophisticated approach. It is intended that the following claims be interpreted to embrace all such variations and modifications.

What is claimed is:

1. A method, comprising:
   receiving, at an electronic computing device, at least two input digital images to combine into a composite digital image;
   determining, at the electronic computing device, a target gradient field for the composite digital image; and
   generating, at the electronic computing device, the composite digital image, wherein said generating the composite digital image comprises:
   determining an estimate of a level of texture for each respective region of a plurality of regions of the composite digital image, and
   minimizing a weighted aggregate error between a gradient field of the composite digital image and the target gradient field,
      wherein minimizing the weighted aggregate error includes weighting errors in a textured region of the composite digital image differently than errors in a smooth region of the composite digital image according to the determined estimated levels of texture.

2. The method of claim 1, wherein said generating the composite digital image further comprises solving a weighted Poisson equation.

3. The method of claim 2, wherein the weighted Poisson equation is linear.

4. The method of claim 1, wherein said minimizing comprises minimizing a weighted least-squares function.

5. The method of claim 1, wherein said determining the estimate of the level of texture for each respective region of the plurality of regions comprises determining a scalar map defining scaling values, each scaling value corresponding to a given region of the plurality of regions, wherein one of the scaling values corresponding to a textured region of the composite image is higher than another of the scaling values corresponding to a smooth region of the composite image.

6. The method of claim 5, wherein the scalar map is not dependent on the composite image or on the gradient field of the composite image.

7. The method of claim 5, wherein the scalar map is dependent on the target gradient field.

8. The method of claim 7, wherein said determining a scalar map comprises calculating the convolution of amplitudes of the target gradient field with a Gaussian kernel.

9. A computer system comprising:
   one or more electronic computing devices;
   a memory coupled to the one or more electronic computing devices and storing program instructions executable by the one or more electronic computing devices processors to:
   receive at least two input digital images to combine into a composite digital image;

determine a target gradient field for the composite digital image; and generate the composite digital image, wherein said generating the composite digital image comprises:

determining an estimate of a level of texture for each respective region of a plurality of regions of the composite digital image, and minimizing a weighted aggregate error between a gradient field of the composite digital image and the target gradient field, wherein minimizing the weighted aggregate error includes weighting errors in a textured region of the composite digital image differently than errors in a smooth region of the composite digital image according to the determined estimated levels of texture.

10. The system of claim 9, wherein said generating the composite digital image further comprises solving a weighted Poisson equation.

11. The system of claim 10, wherein the weighted Poisson equation is linear.

12. The system of claim 9, wherein said minimizing comprises minimizing a weighted least-squares function.

13. The system of claim 9, wherein said determining the estimate of the level of texture for each respective region of the plurality of regions comprises determining a scalar map defining scaling values, each scaling value corresponding to a given region of the plurality of regions, wherein one of the scaling values corresponding to a textured region of the composite image is higher than another of the scaling values corresponding to a smooth region of the composite image.

14. The system of claim 13, wherein the scalar map is not dependent on the composite image or on the gradient field of the composite image.

15. The system of claim 13, wherein the scalar map is dependent on the target gradient field.

16. The system of claim 15, wherein said determining a scalar map comprises calculating the convolution of amplitudes of the target gradient field with a Gaussian kernel.

17. A non-transitory computer-readable storage medium storing program instructions that, responsive to execution by an electronic computing device, cause the electronic computing device to perform operations comprising:

receiving at least two input digital images to combine into a composite digital image;

determining a target gradient field for the composite digital image; and generating the composite digital image, wherein said generating the composite digital image comprises:

determining an estimate of a level of texture for each respective region of a plurality of regions of the composite digital image, and minimizing a weighted aggregate error between a gradient field of the composite digital image and the target gradient field, wherein minimizing the weighted aggregate error includes weighting errors in a textured region of the composite digital image differently than errors in-a smooth region of the composite digital image according to the determined estimated levels of texture.

18. The non-transitory storage medium of claim 17, wherein said generating the composite digital image further comprises solving a weighted Poisson equation.

19. The non-transitory storage medium of claim 18, wherein the weighted Poisson equation is linear.

20. The non-transitory storage medium of claim 17, wherein said minimizing comprises minimizing a weighted least-squares function.

21. The non-transitory storage medium of claim 17, wherein said determining the estimate of the level of texture for each respective region of the plurality of regions comprises determining a scalar map defining scaling values, each scaling value corresponding to a given region of the plurality of regions, wherein one of the scaling values corresponding to a textured region of the composite image is higher than another of the scaling values corresponding to a smooth region of the composite image.

22. The non-transitory storage medium of claim 21, wherein the scalar map is not dependent on the composite image or on the gradient field of the composite image.

23. The non-transitory storage medium of claim 21, wherein the scalar map is dependent on the target gradient field.

24. The non-transitory storage medium of claim 23, wherein said determining a scalar map comprises calculating the convolution of amplitudes of the target gradient field with a Gaussian kernel.

* * * * *

UNITED STATES PATENT AND TRADEMARK OFFICE
CERTIFICATE OF CORRECTION

Page 1 of 1

PATENT NO. : 8,780,135 B2
APPLICATION NO. : 12/393881
DATED : July 15, 2014
INVENTOR(S) : Sylvain Paris It is certified that error appears in the above-identified patent and that said Letters Patent is hereby corrected as shown below:

In the Claims

Column 10, Lines 64-65, delete "processors", therefor.

Signed and Sealed this
Twenty-first Day of October, 2014

Michelle K. Lee
*Deputy Director of the United States Patent and Trademark Office*